(12) United States Patent
O'Neil et al.

(10) Patent No.: US 7,793,305 B2
(45) Date of Patent: Sep. 7, 2010

(54) METHODS AND SYSTEMS FOR PROVIDING A COMMUNICATION MANAGER FOR WIRELESS WIRELINE CONVERGED TELECOMMUNICATION SERVICES

(75) Inventors: Douglas R. O'Neil, Marietta, GA (US); Gregory M. Crisp, Marietta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1149 days.

(21) Appl. No.: 11/178,942

(22) Filed: Jul. 11, 2005

(65) Prior Publication Data

US 2006/0206604 A1  Sep. 14, 2006

Related U.S. Application Data

(60) Provisional application No. 60/661,363, filed on Mar. 14, 2005.

(51) Int. Cl.
G06F 9/44 (2006.01)
G06F 9/46 (2006.01)
G06F 13/00 (2006.01)
G06F 15/16 (2006.01)
H04M 11/00 (2006.01)
H04M 3/42 (2006.01)
H04L 12/66 (2006.01)
H04W 24/00 (2009.01)

(52) U.S. Cl. ............ 719/320; 709/219; 455/403; 455/414.1; 455/456.1; 455/456.2; 455/456.3; 455/456.4; 455/456.5; 455/456.6; 455/457; 370/352; 370/353; 370/354; 370/355; 370/356

(58) Field of Classification Search ............ 719/313, 719/320; 709/201–203, 208, 249, 219; 455/403, 455/414.1, 456.1–457; 370/352–356; 718/105
See application file for complete search history.

(56) References Cited

U.S. PATENT DOCUMENTS

| 6,725,253 B1 * | 4/2004 | Okano et al. ............ 709/203 |
| 7,103,644 B1 * | 9/2006 | Zhang et al. ............ 709/219 |
| 7,130,282 B2 * | 10/2006 | Black ............ 370/296 |
| 7,321,926 B1 * | 1/2008 | Zhang et al. ............ 709/220 |
| 2002/0042812 A1 * | 4/2002 | Spencer ............ 709/203 |
| 2002/0049842 A1 * | 4/2002 | Huetsch et al. ............ 709/225 |
| 2005/0250516 A1 * | 11/2005 | Shim ............ 455/456.1 |

* cited by examiner

Primary Examiner—Qing Wu (57) ABSTRACT

Systems and methods are disclosed for providing a communication manager. The disclosed systems and methods may include receiving a request for a communication service. Furthermore, the disclosed systems and methods may include determining, from a plurality of servers based on the request, a first server capable of servicing the request and transmitting the request to the first server.

19 Claims, 4 Drawing Sheets

METHODS AND SYSTEMS FOR PROVIDING A COMMUNICATION MANAGER FOR WIRELESS WIRELINE CONVERGED TELECOMMUNICATION SERVICES

RELATED APPLICATION

Under provisions of 35 U.S.C. § 119(e), the Applicants claim the benefit of U.S. Provisional Application No. 60/661,363, entitled "COMMUNICATION MANAGER FOR WIRELESS WIRELINE CONVERGED TELECOMMUNICATION SERVICES," filed Mar. 14, 2005, which is incorporated herein by reference.

BACKGROUND OF THE INVENTION

I. Field of the Invention

The present invention generally relates to methods and systems for providing a communication manager. More particularly, the present invention relates to providing a communication manager, for example, for wireless wireline converged telecommunication services.

II. Background Information

In traditional time-division-multiplexing (TDM) telecommunications networks, typically devices are simple, such as a plain old telephone system (POTS) telephone with dual-tone multi-frequency (DTMF) or a cellular telephone with a keypad and small screen. Control of telecommunication communication service by a POTS phone with DTMF may be cumbersome and may require an end user, for example, to know a special code to enable a feature and another special code to disable the feature. Cellular telephone devices may provide a slight improvement in capabilities over POTS by adding visual menus with "point and click" ability to enable/disable features. These capabilities, however, are typically "hard coded" into the cellular telephone devices.

Recently, voice-over-internet protocol (VoIP) services have been more widely adopted. These services may allow a user to make and receive voice telephone calls and may include advance call features. Examples of the advanced call features may include simultaneous ring, sequential ring, call forwarding, call waiting, call hold, and call conferencing. A user may use a personal computer (PC) client or a web page to enable, disable, or control the advance call features. However, the marketplace is demanding converged telecommunication services, that typically require a network architecture. This network architecture may be based on internet protocol and may use multiple application servers interacting with each other to provide the converged service for an end user.

In view of the foregoing, there is a need for methods and systems for providing a communication management tool to manage more advanced and more sophisticated communication services and communication applications associated with converged telecommunication services. Also there is a need for a simple user interface that simplifies the end user's ability to manage the converged telecommunications services. There is a need for this user interface at least because the converged telecommunications services can be confusing for the end-user unless there is a user interface that simplifies the end user's ability to manage the converged telecommunications services.

SUMMARY OF THE INVENTION

Consistent with embodiments of the present invention, systems and methods are disclosed for providing a communication manager.

In accordance with one embodiment, a method for providing a communication manager comprising receiving a request for a communication service, determining, from a plurality of servers based on the request, a first server capable of servicing the request, and transmitting the request to the first server.

According to another embodiment, a system for providing a communication manager comprising a memory storage for maintaining a database and a processing unit coupled to the memory storage, wherein the processing unit is operative to receive a request for a communication service, determine, from a plurality of servers based on the request, a first server capable of servicing the request, and transmit the request to the first server.

In accordance with yet another embodiment, a computer-readable medium which stores a set of instructions which when executed performs a method for providing a communication manager, the method executed by the set of instructions comprising receiving a request for a communication service, determining, from a plurality of servers based on the request, a first server capable of servicing the request, and transmitting the request to the first server.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Systems and methods consistent with embodiments of the present invention provide a communication manager for wireless wireline converged telecommunication services. For example, embodiments of the present invention includes a communication services management tool that provides a user interface to manage and control converged telecommunications services. This user interface allows a user to manage and control a portfolio of wireless and wireline converged voice and data telecommunications services. The controlled telecommunications services may comprise converged services, for example, services available from wireless devices or wired devices and from multiple device types. Converged communication services allow the user to have the same experience regardless of how the user accesses the telecommunications services.

The user interface for the communication manager may be available to the user from a variety of devices (wireless or wired) that may have different form factors. The user's experience, however, may be similar regardless of the device used to access the user interface. Furthermore, the user interface may be implemented, for example, using a network or using a client on a personal computer, PDA, wireless phone, or any other computing device that may have communications capabilities.

An embodiment consistent with the invention comprises a system for providing a communication manager. The system comprises a memory storage for maintaining a database and a processing unit coupled to the memory storage. The processing unit is operative to receive a request for a communication service. Furthermore, the processing unit may be operative to determine, from a plurality of servers based on the request, a first server capable of servicing the request and transmit the request to the first server.

Figure 1A:
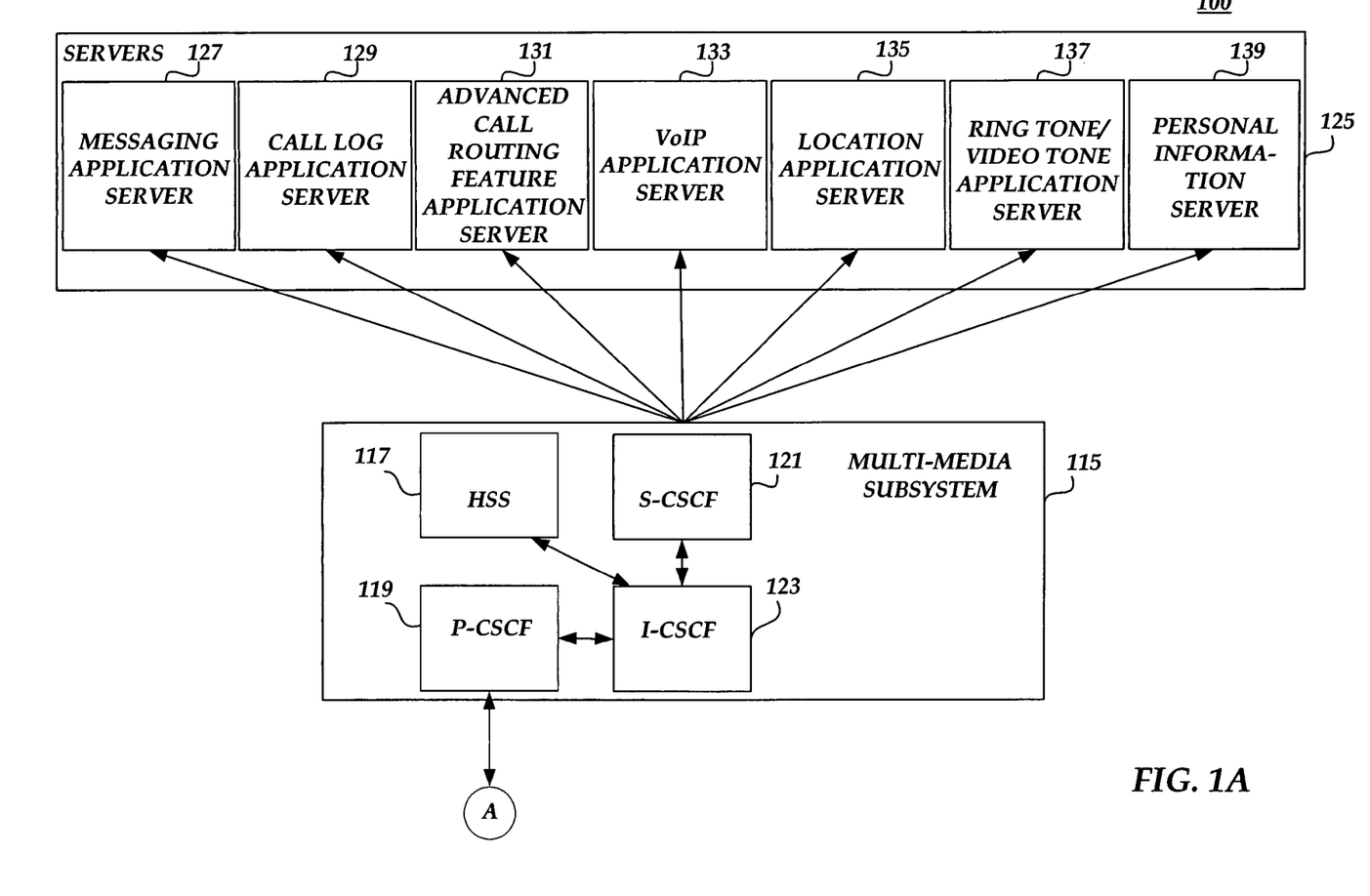
FIG. 1A and FIG. 1B is a block diagram of an exemplary communication management system consistent with an embodiment of the present invention.
Figure 1B:
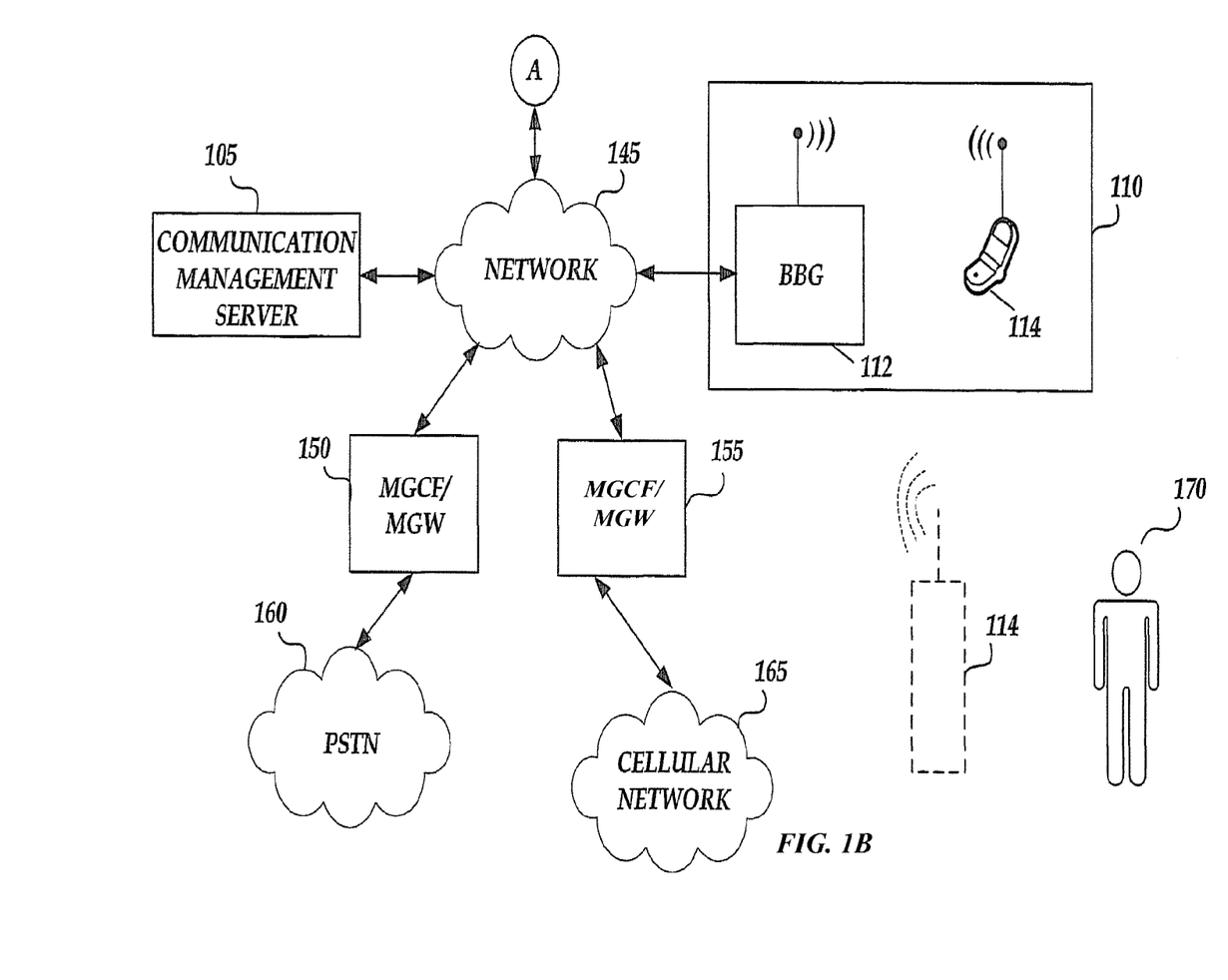

Consistent with an embodiment of the present invention, the aforementioned memory, processing unit, and other components may be implemented in a communication management system, such as an exemplary communication management system 100 of FIG. 1A and FIG. 1B. Any suitable combination of hardware, software, and/or firmware may be used to implement the memory, processing unit, or other components. By way of example, the memory, processing unit, or other components may be implemented with any of a communication management (CM) server 105 or an end use device 114, in combination with system 100. The aforementioned system 100, server 105, and device 114 are exemplary and other systems, servers, and devices may comprise the aforementioned memory, processing unit, or other components, consistent with embodiments of the present invention.

By way of a non-limiting example, FIG. 1A and FIG. 1B illustrate system 100 in which the features and principles of the present invention may be implemented. As illustrated in the block diagram of FIG. 1A and FIG. 1B, system 100 includes CM server 105, end point 110, an internet protocol multi-media subsystem (IMS) 115, a plurality of servers 125, a network 145, a publicly switched telephone network (PSTN) media gateway control function/media gateway (MGCF/MGW) 150, a cellular network MGCF/MGW 155, a PSTN 160, a cellular telephone network 165, and a user 170. End point 110 comprises a broadband gateway (BBG) 112 and end use device 114. IMS 115 may comprise a home subscriber server (HSS) 117, a proxy call session control function (P-CSCF) 119, a serving call session control function (S-CSCF) 121, and an interrogating call session control function (I-CSCF) 123. Plurality of servers 125 comprise: a messaging application server 127; a call log application server 129; an advanced call routing feature application server 131; a VoIP application server 133; a location application server 135; a ring tone/video tone application server 137; and a personal information server 139. The aforementioned are exemplary and plurality of servers 125 may include other servers. User 170 may be an individual, for example, desiring to establish communication management. User 170 may also be an organization, enterprise, or any other entity having such desires.

Regarding end point 110, BBG 112 may comprise a wireless local area network interface (e.g., WLAN, IEEE 802.11), a bluetooth interface, another RF communication interface, and/or an optical interface. BBG 112 may provide a wireline or a wireless connection between end use device 114 and network 145. BBG 112 may connect to network 145, for example, through a digital subscriber line (DSL) or via a coaxial cable. The aforementioned are exemplary, and BBG 112 may connect to network 145 via other ways.

End use device 114 may comprise, any device capable of communicating with CM server 105 (via a browser, for example.) Furthermore, end use device 114 may comprise, any device capable of executing a software module to perform communications management consistent with embodiments of the invention. For example, end use device 114 may comprise a personal computer, a cellular telephone, a cordless telephone, a session initiated protocol (SIP) telephone, and a cordless (SIP) telephone. Moreover, end use device 114 may comprise a dual mode handset capable of connecting to network 145 via either BBG 112 or cellular network 165. The aforementioned are exemplary and end use device may comprise other elements and devices.

PSTN MGCF/MGW 150 and cellular network MGCF/MGW 155 respectively provide interfaces between network 145 and PSTN 160 and cellular telephone network 165. PSTN MGCF/MGW 150 and cellular network MGCF/MGW 155 may be configured to receive a call from a circuit switched network (PSTN 160 or cellular telephone network 165 respectively) and translate the respective protocol to a protocol supported by network 145.

Regarding IMS 115, HSS 117 may keep the profile of user 170's service, may keep "filter criteria", and may identify "filters" that may be engaged in a call to assist in call processing and provide services during the call. The "filter criteria" may define the different application servers (e.g., any one or more of plurality of servers 125) that may be engaged in the call session to provide applications and services. The services such as call routing, mobility management, location, video calling, ring tone applications, ringback tone applications, video tones, and call logs, for example, may operate on application servers and can be identified within the "initial filter criteria".

I-CSCF 123 may comprise a call entry point to IMS 115 from another network (such as a PSTN 160 or cellular telephone network 165.) S-CSCF 121 may control the call session for end use device 114. When end use device 114 registers to IMS 115, S-CSCF 121 may interrogate HSS 117 and may extract user 170's services, the "initial filter criteria", and the addresses of the "filters" associated with user 170's services. For example, S-CSCF 121 may: i) set-up the call session with end use device 114; ii) engage the various (application) servers 125 during the call set-up; iii) establish the call session with the answering device (or apply secondary call treatment, if required); and iv) end the call session upon a call termination message receipt. P-CSCF 119 may comprise an entry point for an IMS device into network 145. Generally, P-CSCF 119 may comprise the first/last IMS network element that may communicate with an end point IMS device, for example, end use device 114.

Figure 2:
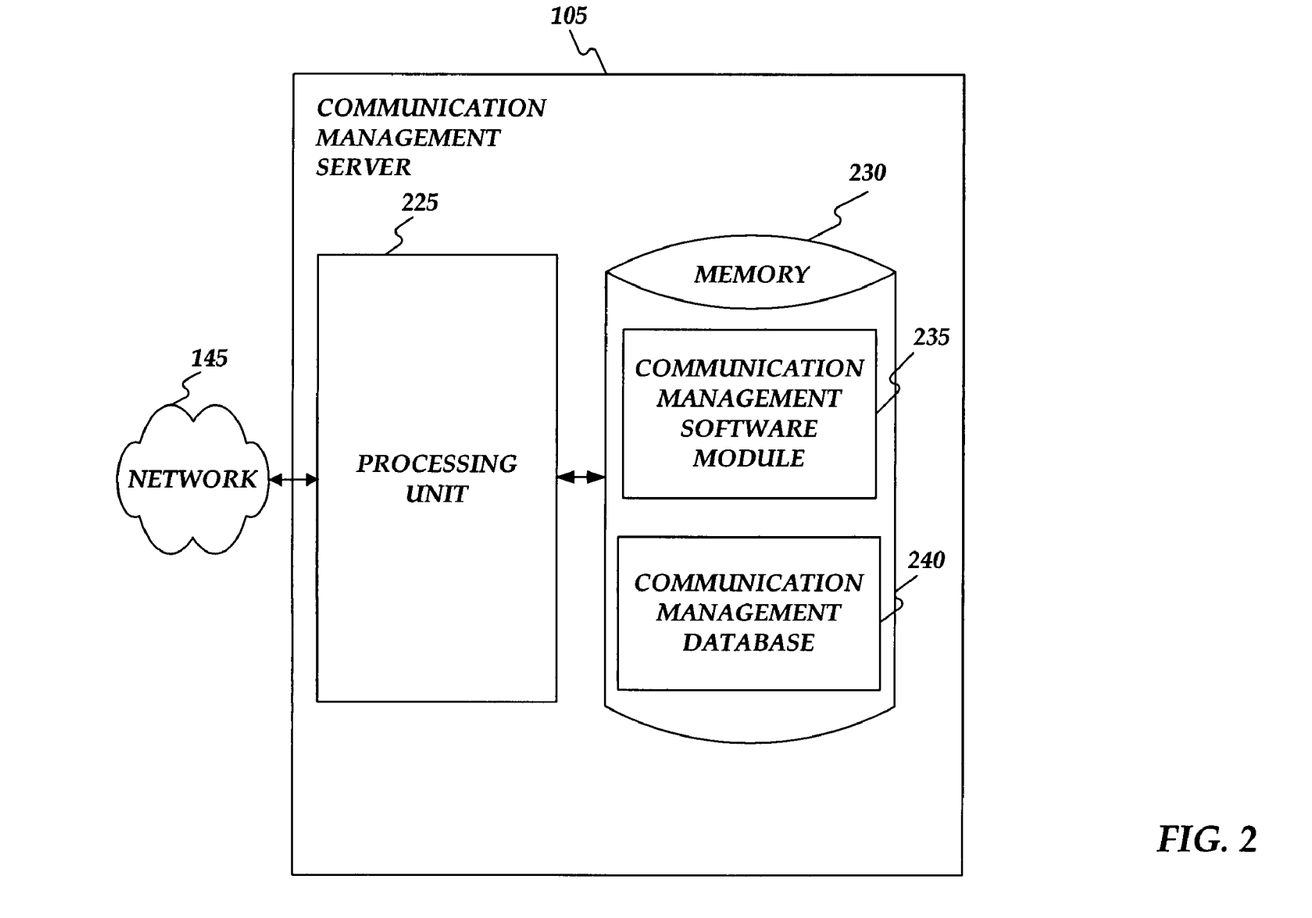
FIG. 2 is a block diagram of a communication management server consistent with an embodiment of the present invention.

FIG. 2 shows CM server 105 of FIG. 1A and FIG. 1B in more detail. As shown in FIG. 2, CM server 105 includes a processing unit 225 and a memory 230. Memory 230 includes a CM software module 235 and a CM database 240. While executing on processing unit 225, CM software module 235 performs processes for communication management, including, for example, one or more of the stages of method 300 described below with respect to FIG. 3. Furthermore, any combination of software module 235 and database 240 may be executed on or reside in any one or more of plurality of servers 125 or end use device 114.

CM server 105, any one of the plurality of servers 125, or end use device 114 ("the servers") included in system 100 may be implemented using a personal computer, network computer, mainframe, or other similar microcomputer-based workstation. The servers may though comprise any type of computer operating environment, such as hand-held devices, multiprocessor systems, microprocessor-based or programmable sender electronic devices, minicomputers, mainframe computers, and the like. The servers may also be practiced in distributed computing environments where tasks are performed by remote processing devices. Furthermore, any of the servers may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the server may comprise other systems or devices.

Network 145 may comprise, for example, a local area network (LAN) or a wide area network (WAN). Such networking environments are commonplace in offices, enterprise-wide computer networks, intranets, and the Internet. When a LAN is used as network 145, a network interface located at any of the servers may be used to interconnect any of the servers. When network 145 is implemented in a WAN networking environment, such as the Internet, the servers may typically include an internal or external modem (not shown) or other means for establishing communications over the WAN. Further, in utilizing network 145, data sent over network 145 may be encrypted to insure data security by using known encryption/decryption techniques.

In addition to utilizing a wire line communications system as network 145, a wireless communications system, or a combination of wire line and wireless may be utilized as network 145 in order to, for example, exchange web pages via the internet, exchange e-mails via the internet, or for utilizing other communications channels. Wireless can be defined as radio transmission via the airwaves. However, it may be appreciated that various other communication techniques can be used to provide wireless transmission, including infrared line of sight, cellular, microwave, satellite, packet radio, and spread spectrum radio. The servers in the wireless environment can be any mobile terminal, such as the mobile terminals described above. Wireless data may include, but is not limited to, paging, text messaging, e-mail, internet access and other specialized data applications specifically excluding or including voice transmission. For example, the servers may communicate across a wireless interface such as, for example, a cellular interface (e.g., general packet radio system (GPRS), enhanced data rates for global evolution (EDGE), global system for mobile communications (GSM)), a wireless local area network interface (e.g., WLAN, IEEE 802.11), a bluetooth interface, another RF communication interface, and/or an optical interface.

System 100 may also transmit data by methods and processes other than, or in combination with, network 145. These methods and processes may include, but are not limited to, transferring data via, diskette, flash memory sticks, CD ROM, facsimile, conventional mail, an interactive voice response system (IVR), or via voice over a publicly switched telephone network.

Figure 3:
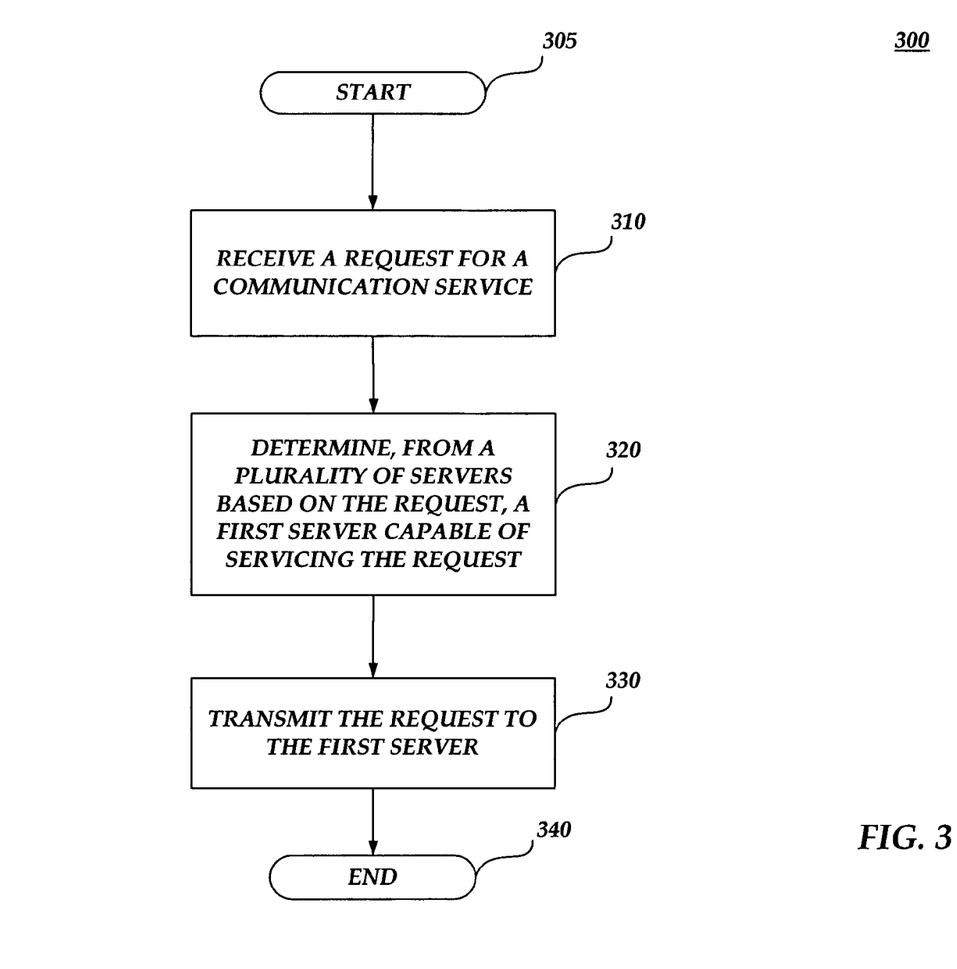
FIG. 3 is a flow chart of an exemplary method for providing a communication manager consistent with an embodiment of the present invention.

FIG. 3 is a flow chart setting forth the general stages involved in an exemplary method 300 consistent with the invention for providing a communication manager using system 100 of FIG. 1A and FIG. 1B. Exemplary ways to implement the stages of exemplary method 300 will be described in greater detail below. The stages of exemplary method 300 may be executed on communication server 105, end user device 114 or any combination thereof by executing, for example, CM software module 235. The aforementioned are exemplary, and the stages of exemplary method 300 may be executed on other elements, devices, processors, or servers.

Exemplary method 300 begins at starting block 305 and proceeds to stage 310 where CM server 105 receives a request for a communication service. For example, user 170 may access CM server 105 through end use device 114 and make a request for a communication service. Furthermore, user 170 may access CM server 105 through a PC or any other device capable accessing network 145 using, for example a browser. The request for the communication service may relate to, for example, messaging, call log, advanced call routing features, VoIP, location, ring tone/video tone, or personal information. The aforementioned communication services are exemplary and others may be requested by user 170.

User 170 may have been previously provided a user name and a password. The user name and password may be entered on a user interface's main screen on end use device 114 or user 170 may set the main screen to always remember the name and password. The user interface may be user friendly and can be used by a single user (e.g., user 170) for that user's converged services, or by multiple users who may share converged services (such as a family or multi-user household, or small business or work team.) In the family case, the user interface may allow converged services management associated with a residential home telephone service, for example.

Moreover, the user interface may be able to access call conferencing. For example, user 170 may establish a conference call with other parties by dialing the parties and adding to the call. Furthermore, the user interface may have a visual and audible voicemail message waiting indicator on, for example, a dashboard and/or the main screen. The visual message waiting indicator may be the number of unheard voicemail messages.

From stage 310, where CM server 105 receives the request for the communication service, exemplary method 300 advances to stage 320 where CM server 105 determines, from a plurality of servers (e.g., plurality of server 125) based on the request, a first server capable of servicing the request. For example, CM server 105 may parse the request for the communication service and select at least one of the plurality of servers 125 to best service the request. The selected at least one of the plurality of servers 125 may comprise the first server capable of servicing the request.

For example, if the request for the communication service relates to access to messaging, then CM server 105 determines the first server to be messaging application server 127. In this case, the user interface allows user 170 to access all received message within their messages' stores, including voice mail, email, and video mail. The message storage device could be completely integrated in messaging application server 127 for all messaging services, such as a unified message storage for voice mail, email, and video mail or the message storage devices could be separate email, voice mail, or video mail storage devices on separate servers.

If the request for the communication service relates to access to call logs, then CM server 105 determines the first server to be call log application server 129. Consistent with an embodiment of the invention, user 170 can access call logs by entering, for example, user 170's telephone number into the user interface. Under a call log screen, the user interface may display phones numbers (e.g., residential home numbers, personal numbers, and business numbers) that are associated with user 170's name for that current session. If user 170 enters a telephone number that is not associated with user 170's user name for that current session, CM server 105 may cause the user interface to display a message that asks user 170 to enter a user name and password and state that the phone number entered is associated with a different user name. The call log screen may show the caller's caller line ID, and may show the caller's name, if available. The caller's name may be extracted, for example, by accessing a telephone company's calling name database or the user's address book.

If the request for the communication service relates to access to call routing, then CM server 105 determines the first server to be advanced call routing feature application server 131. From the user interface, user 170 may be able to enable/disable call routing features associated with, for example, the family telephone number. Such call routing features may comprise family number ringing of end use device 114, family number sequential call routing, and family number simultaneous ringing. In addition, from the user interface, user 170 may be able to enable/disable the call routing features associated with a personal number. Such features may include, for example, personal number simultaneous ring of home telephone equipment.

If the request for the communication service relates to VoIP, then CM server 105 determines the first server to VoIP application server 133. For example, the VoIP application server contains call routing functions such as simultaneous ring, sequential ring, call forwarding. The end user may choose to identify which phones should be called simultaneously through the CM, and the CM will provide that information to the VoIP applications server. Similarly, the end user may want to call forward a particular phone to another phone. The CM will accept this information from the end user and send it to the VoIP application server. The VOIP application server is responsible for routing and applying call treatments prior to outbound calls being sent on or off the network, via the Public Switched Telephone Network (PSTN), an Internet Protocol-based network, or some other network, either wireless or wireline. The VOIP application server is also responsible for applying routing of calls and application of call treatments to inbound calls placed to users of the VOIP network and services.

If the request for the communication service relates to location, then CM server 105 determines the first server to be location application server 135. For example, the user interface may allow user 170 to know the presence of persons for which there is an entry within the user's address book. User 170 may see presence in several ways. First, within an address book entry an icon may display that the address book entry has a personal device that is active on the communication system. Second, when user 170 accesses the call log, a caller line ID of a call may also display the name of the caller. Moreover, if the caller has a personal communication device active on the communication network, the user interface may display an icon to indicate so. And third, the user interface may have an option called "presence". When user 170 accesses this option, the list of persons within the user's address book that are active on the communication network may be displayed.

Furthermore, the user interface allows user 170 to determine the physical location of other people. This may be displayed, for example, in two ways. First, when the presence of another person within the address book is displayed, the user may click on a "presence icon". The user interface may engage a session with the location application to display the physical location information of the other party, which may be in the form of latitude and longitude, an icon on a map, or a direction arrow with distance. Second, the user interface may have a "location services" option. When user 170 chooses this option, the user interface may engage a session with location application server 135. In turn, location application server 135 may display a list of people and objects (i.e., tags) that could be located by user 170. User 170 could then choose from this list the person or object that user 170 wishes to locate.

If the request for the communication service relates to ring tones or video tones, then CM server 105 determines the first server to be ring tone/video tone application server 137. From the user interface, user 170 may be able to enable/disable distinctive ringing feature for a personal number, for example. User 170 may be able to set a desired ring type for user 170's personal number. Furthermore, the user interface may allow user 170 to set a ring tone (or video tone) for an incoming caller via the address book. In this case, user 170 may access an address book entry and then associate a ring tone (or video tone) from user 170's personal ring tone (or video tone) library with the address book entry. The ring tone (or video tone) settings may be synchronized across all of the user's devices. In this way, an incoming call to any of end user 170 devices may ring with the ring tone (or video tone) specified for that particular caller.

If the request for the communication service relates to user 170's address book, then CM server 105 determines the first server to be personal information server 139. The user interface allows user 170 to access user 170's address book. The address book may be synchronized across all of the devices used by the subscriber using an automated synchronization protocol such as Sync ML, for example. In this way, when user 170 makes a change to the address book, the devices for that subscriber may automatically sync using Sync ML, for example, and whatever communication channel is available (WiFi, cellular data such as GPRS or CDMA 1XRTT, or Ethernet, for example.)

Moreover, the user interface may integrate many applications within user 170's address book. The user interface may allow user 170 to purchase ring tones and apply the ring tones to multiple devices that are capable of supporting ring tones. The user interface may allow user 170 to set a permission code to allow other users to know information about the user, such as user 170's presence on the communication network, user 170's physical location, and user 170's personal communication device's location. In this way the user interface may provide an integration function and therefore provide converged communication services.

Consistent with an embodiment of the invention, the address book includes: name; physical address; telephone numbers; email addresses; presence indication; message waiting indication (voice mail, email, video mail, short message); assignment of distinctive ringing ring tones (or video tones) by address book entry or by telephone number within address book entry; assignment of a distinctive "ringback" tone or "ringback" message (or video tones and video playback messages) to be heard by the caller when the caller is calling the user; assignment of ring tone (or video tone) to be delivered with an outgoing call by address book entry; assignment of permission code to allow an entry within the address book to see the user's presence information; assignment of a permission code to allow an entry within the address book to see the physical location of the user or devices controlled by the user; and assignment of a permission code to allow an entry within the address book to send a ring tone (or video tone) when making an outbound call to the user. The aforementioned are exemplary and the address book may include other elements or entries.

Once CM server 105 determines the first server capable of servicing the request in stage 320, exemplary method 300 continues to stage 330 where CM server 105 transmits the request to the first server. For example, CM server 105 determines that one of the plurality of servers 125 can service the request. At this point, CM server 105 sends the request to the determined one of the plurality of servers 125. The determined one of the plurality of servers 125 then carries out the request in conjunction with multi-media subsystem 115 and other elements of system 100. After CM server 105 transmits the request to the first server in stage 330, exemplary method 300 then ends at stage 340.

Furthermore, the invention may be practiced in an electrical circuit comprising discrete electronic elements, packaged or integrated electronic chips containing logic gates, a circuit utilizing a microprocessor, or on a single chip containing electronic elements or microprocessors. The invention may also be practiced using other technologies capable of performing logical operations such as, for example, AND, OR, and NOT, including but not limited to mechanical, optical, fluidic, and quantum technologies. In addition, the invention may be practiced within a general purpose computer or in any other circuits or systems.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, or communicate the program for use by or in connection with the instruction execution system, apparatus, or device. Additionally, another type(s) of medium may be used to propagate or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device, medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described above with reference to block diagrams and/or operational illustrations of methods, systems, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method for providing a communication manager, the method comprising:
    employing at least one processor to execute computer executable instructions stored in memory to perform acts comprising:
        providing a user interface to a first end use device for management of converged wireless and wireline telecommunication services;
        receiving a request for a communication service;
        applying predefined filter criteria to the request, the filter criteria define a plurality of servers such that each of the plurality of servers is associated with at least one of a plurality of service applications offered by the converged wireless and wireline telecommunication services;
        selecting, by the first end use device, from the plurality of servers based at least in part on the request and the predefined filter criteria, a first server providing the communication service requested in the request;
        transmitting the request to the first server; and
        automatically synchronizing at least one application parameter associated with the first end use device, wherein the at least one application parameter relates to the communication service requested in the request, with at least one corresponding application parameter on at least one other end use device associated with the first end use device, so that the at least one application parameter and the at least one corresponding application parameter are same with each other.

2. The method of claim 1, wherein at least one of the acts of receiving, selecting, transmitting, or synchronizing are performed on the first end use device.

3. The method of claim 1, wherein at least one of receiving or transmitting are performed on a communication management server remote from the first end use device.

4. The method of claim 1, wherein receiving the request further comprises receiving at least one of a messaging request, a call log request, an advanced call routing features request, a VoIP request, a location request, a ring tone request, a video tone request, and a personal information request, or a presence information request.

5. The method of claim 1, wherein selecting from the plurality of servers further comprises selecting at least two of a messaging application server, a call log application server, an advanced call routing feature application server, a VoIP application server, a location application server, a ring tone application server, video tone application server, or a personal information server.

6. The method of claim 1, further comprising:
receiving a confirmation that the request has been received by the first server; and
transmitting the confirmation to the first end use device.

7. A system that provides a communication manager, the system comprising:
a memory storage for maintaining a database; and
at least one processing unit coupled to the memory storage, wherein at least one of the memory storage or the at least one processing unit are located on a first end rise device, the at least one processing unit effects the following:
provides a communication management interface for management of services comprising wireless and wireline converged telecommunication services;
displays in the communication management interface a presence indicator that indicates that at least one other end use device is operating in a communication network associated with the first end use device;
receives at least a first request for a communication service associated with the converged telecommunication services, the at least the first request comprising a location request relating to an application for identifying a physical location of the at least one other end use device;
associates each of a plurality of servers with particular disparate applications providing the converged telecommunication services;
identifies one or more filters that are engaged in a call to service the at least the first request, wherein the identified one or more filters relate to identity of the plurality of application servers;
identifies, from the plurality of servers based at least in part on the at least the first request and the identified one or more filters, a first server capable of servicing the at least the first request, the first server facilitating identification of the physical location of the at least one other end use device;
transmits the at least the first request to the first server; and
displays, in the communication management interface, the physical location of the at least one other end use device in response to the at least the first request.

8. The system of claim 7, wherein the memory storage and the at least one processing unit are located on the first end use device.

9. The system of claim 7, wherein, if one of the memory storage or the at least one processing unit are not located on the first end use device, the memory storage or the at least one processing unit not located on the first end use device are located on a communication management server remote from the first end use device.

10. The system of claim 7, wherein the at least one processing unit being operative to:
receive at least one other request for a communication service relating to simultaneous ring and associated with the converged telecommunication services, wherein the at least one other request relates to an application that facilitates simultaneous calling and ringing of the first end use device and the at least one other end use device when a call is initiated to the least one other end use device; and
configure the first end use device and the at least one other end use device to simultaneously ring when a call is received by the at least one other end use device.

11. The system of claim 7, wherein the at least one processing unit being operative to receive at least one other request comprising at least one of a messaging request, a call log request, an advanced call routing features request, a VoIP request, a location request, a ring tone request, a video tone request, a personal information request, or a presence information request.

12. The system of claim 7, wherein the at least one processing unit being operative to further identify, from the plurality of servers at least two of a messaging application server, a call log application server, an advanced call routing feature application server, a VoIP application server, a location application server, a ring tone application server, video tone application server, or a personal information server.

13. The system of claim 7, if the at least one processing unit is not located on the first end use device, then the at least one processing unit is located on a communication management server remote from the first end use device being operative to:
receive a confirmation that the at least the first request has been received by the first server; and
transmit the confirmation to the first end use device.

14. A non-transitory computer-readable medium which stores a set of instructions for management of wireless and wireline communication services, the set of instructions when executed by a computer perform the acts comprising:
receiving a request for a communication service from a user interface on a first end use device, the user interface provides for management of converged wireless and wireline telecommunication services;
identifying one or more filters to be applied for the request based at least in part on filter criteria related to disparate applications and services provided by a plurality of servers;
identifying, by the first end use device, from the plurality of servers based at least in part on the one or more filters applied to the request, a first server capable of servicing the request;
transmitting the request to the first server; and
automatically synchronizing at least one parameter associated with the first end use device, wherein the at least one parameter relates to the communication service associated with the request, with at least one corresponding parameter on at least one other end use device associated with the first end use device, so that the at least one parameter and the at least one corresponding parameter are same with each other.

15. The non-transitory computer-readable medium of claim 14, wherein at least one of receiving, identifying, transmitting, or synchronizing are performed on the first end use device.

16. The non-transitory computer-readable medium of claim 14, wherein at least one of receiving or transmitting are performed on a communication management server remote from the first end use device.

17. The non-transitory computer-readable medium of claim 14, wherein receiving the request further comprises receiving at least one of a messaging request, a call log request, an advanced call routing features request, a VoIP request, a location request, a ring tone request, a video tone request, a personal information request, or a presence request.

18. The non-transitory computer-readable medium of claim 14, wherein identifying, by the first end use device, from the plurality of servers further comprises identifying, by the first end use device, from the plurality of servers at least two of a messaging application server, a call log application server, an advanced call routing feature application server, a VoIP application server, a location application server, a ring tone application server, video tone application server, or a personal information server.

19. The non-transitory computer-readable medium of claim 14, further comprising:

receiving a confirmation that the request has been received by the first server; and transmitting the confirmation to the first end use device.

\* \* \* \* \*